US008719466B2

(12) United States Patent
Duncan et al.

(10) Patent No.: US 8,719,466 B2
(45) Date of Patent: May 6, 2014

(54) DIRECT DATA TRANSFER FOR DEVICE DRIVERS

(75) Inventors: Jeffrey David Duncan, Broomfield, CO (US); Damon Neil Clark, Longmont, CO (US)

(73) Assignee: Oracle International Corporation, Redwood City, CA (US)

( * ) Notice: Subject to any disclaimer, the term of this patent is extended or adjusted under 35 U.S.C. 154(b) by 165 days.

(21) Appl. No.: 13/328,739

(22) Filed: Dec. 16, 2011

(65) Prior Publication Data

US 2013/0159564 A1 Jun. 20, 2013

(51) Int. Cl.
*G06F 13/28* (2006.01)
*G06F 12/02* (2006.01)
*G06F 15/167* (2006.01)

(52) U.S. Cl.
USPC ............... 710/26; 710/22; 710/23; 709/212; 709/213; 709/216; 711/1; 711/2; 711/6

(58) Field of Classification Search
None
See application file for complete search history.

(56) References Cited

U.S. PATENT DOCUMENTS

| 7,506,343 | B2 * | 3/2009 | Aslot et al. | 719/324 |
| 7,669,033 | B2 * | 2/2010 | Hepkin | 711/204 |
| 2006/0136612 | A1 * | 6/2006 | Aslot et al. | 710/22 |
| 2008/0065854 | A1 * | 3/2008 | Schoenberg et al. | 711/203 |
| 2012/0017029 | A1 * | 1/2012 | Santos et al. | 711/6 |
| 2012/0159245 | A1 * | 6/2012 | Brownlow et al. | 714/23 |
| 2012/0284712 | A1 * | 11/2012 | Nimmagadda et al. | 718/1 |

* cited by examiner

*Primary Examiner* — Michael Sun
(74) *Attorney, Agent, or Firm* — Osha Liang LLP

(57) ABSTRACT

A method for performing direct memory access includes obtaining, by a application executing on a host, a kernel address space identifier of a first driver kernel memory. The application sends the kernel address space identifier to a second device driver. The second device driver obtains, using the kernel address space identifier, a cookie structure binding the first driver kernel memory to a second device driver address space for the first driver kernel memory. The application sends a request for a direct memory access operation. The request includes a location identifier of a location storing a data object in the first driver kernel memory. Based on the cookie structure, the second device driver performs, using the location identifier, the direct memory access operation to transfer the data object from the first driver kernel memory to a second driver kernel memory.

20 Claims, 17 Drawing Sheets

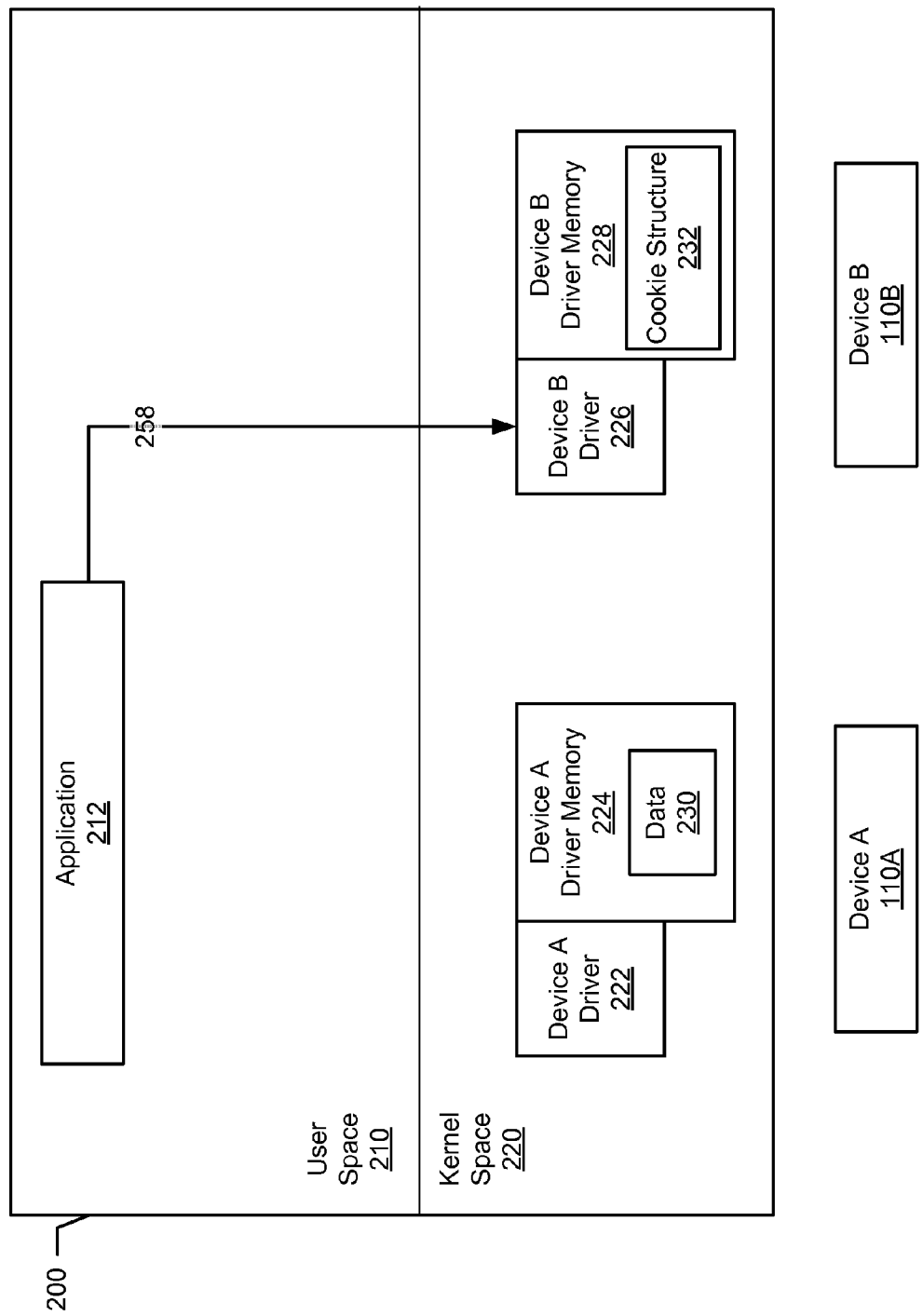

| | Process Translation Table 620 | | |
|---|---|---|---|
| Process ID | User Virtual Address | | Driver Address |
| $ID_1$ | $UA_1$ | .... | $DA_1$ |
| $ID_1$ | $UA_2$ | .... | $DA_2$ |
| $ID_1$ | $UA_3$ | .... | $DA_3$ |
| $ID_2$ | $UA_1$ | .... | $DA_4$ |
| $ID_2$ | $UA_2$ | .... | $DA_5$ |
| $ID_2$ | $UA_3$ | .... | $DA_6$ |
| ● | ● | | ● |
| $ID_N$ | $UA_n$ | .... | $DA_n$ |

FIG. 6

DIRECT DATA TRANSFER FOR DEVICE DRIVERS

BACKGROUND

Some modern computer systems include programs called device drivers, which enable an operating system to interact with a hardware device. In some systems, each device driver is allocated a portion of memory to store data used by the driver. Conventionally, in the event that a data object used by a first device driver is needed by a second device driver, the data object may need to be copied from the memory allocated to the first device driver to the memory allocated to the second device driver. Such copying may require multiple copies of the data object.

SUMMARY

In general, in one aspect, the invention relates to a method for performing direct memory access. The method includes obtaining, by a first application executing on a host, a first kernel address space identifier of a first driver kernel memory. The first driver kernel memory is a portion of kernel space allocated to a first device driver. The first device driver is for a first device operatively connected to the host. The first application sends the first kernel address space identifier to a second device driver, where the second device driver is for a second device operatively connected to the host. The second device driver obtains, using the first kernel address space identifier, a cookie structure binding the first driver kernel memory to a second device driver address space for the first driver kernel memory. The first application sends a first request for a first direct memory access operation, where the first request includes a first location identifier of a first location storing a first data object in the first driver kernel memory. Based on the cookie structure, the second device driver performs, using the first location identifier, the first direct memory access operation to transfer the first data object from the first driver kernel memory to a second driver kernel memory. The second driver kernel memory is a portion of kernel space allocated to the second device driver.

In general, in one aspect, the invention relates to a host that includes a hardware processor, a bus, a first device operatively connected to the bus, a second device operatively connected to the bus, and a physical memory, addressable by a virtual memory having a kernel space and a user space. The physical memory includes a first device driver, where the first driver is a device driver for the first device. The physical memory further includes a first driver kernel memory corresponding to a portion of kernel space allocated to the first device driver, where the first driver kernel memory comprising a first data object, and where the first data object is addressable by a kernel address, a driver address, and a first user virtual address. The physical memory further includes a first application configured to obtain a first kernel address space identifier of the first driver kernel memory, send the first kernel address space identifier to a second device driver for a second device, and send a first request for a first direct memory access operation, wherein the first request includes a first location identifier of a first location storing a first data object in the first driver kernel memory. The physical memory further includes the second driver configured to obtain, using the first kernel address space identifier, a cookie structure binding the first driver kernel memory to a second device driver address space for the first driver kernel memory, and perform, based on the cookie structure, and using the first location identifier, the first direct memory access operation to transfer the first data object from the first driver kernel memory to a second driver kernel memory. The second driver kernel memory is a portion of kernel space allocated to the second device driver.

In general, in one aspect, the invention relates to a non-transitory computer readable medium comprising computer readable program code embodied therein for causing a computer system to perform a method for performing direct memory access between a first device corresponding to a first device driver and a second device corresponding to a second device driver. The method includes obtaining, by the second device driver from a first application, a first kernel address space identifier of a first driver kernel memory. The first driver kernel memory is a portion of kernel space allocated to a first device driver. The second device driver obtains, using the first kernel address space identifier, a cookie structure binding the first driver kernel memory to a second device driver address space for the first driver kernel memory, and receives, from the first application, a first request for a first direct memory access operation. The first request includes a first location identifier of a first location storing a first data object in the first driver kernel memory. The second device driver performs, based on the cookie structure, and using the first location identifier, the first direct memory access operation to transfer the first data object from the first driver kernel memory to a second driver kernel memory. The second driver kernel memory is a portion of kernel space allocated to the second device driver.

Other aspects of the invention will be apparent from the following description and the appended claims.

BRIEF DESCRIPTION OF DRAWINGS

FIGS. 2A-2E show an example in accordance with one or more embodiments of the invention.

FIG. 6 shows a translation table in accordance with one or more embodiments of the invention.

DETAILED DESCRIPTION

Figure 1:
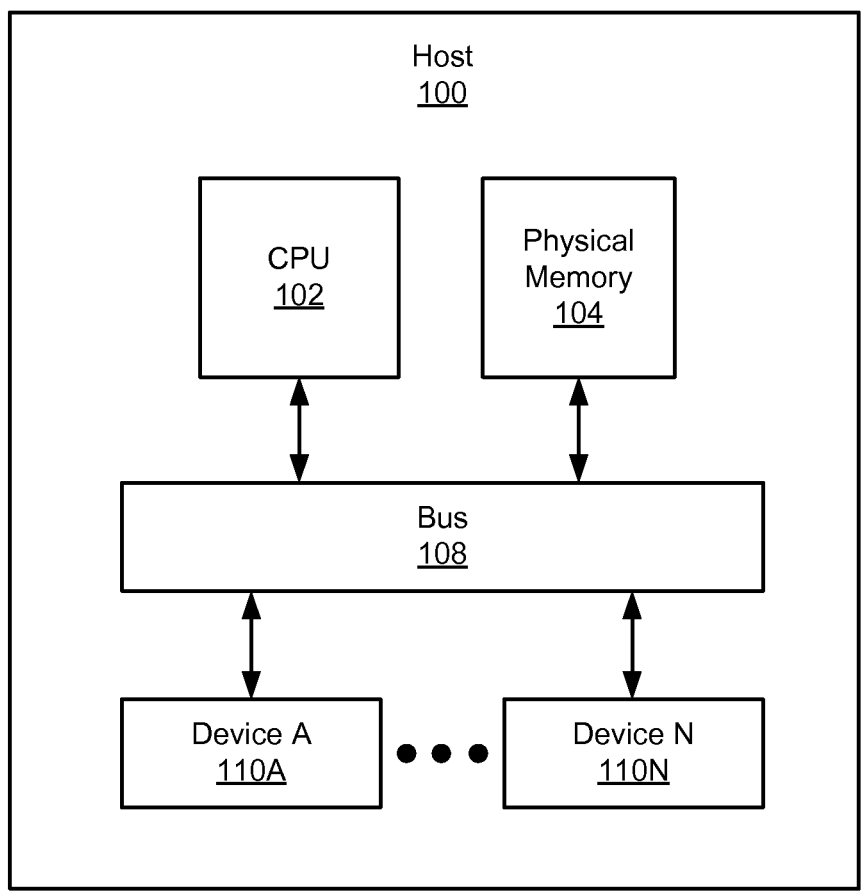
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing direct memory access from kernel space allocated to the device driver of a first device (denoted herein as "device A driver") to kernel space allocated to the device driver of a second device (denoted herein as "device B driver"). The kernel space allocated to the device A driver is driver A kernel memory. The kernel space allocated to the device B driver is driver B kernel memory. Specifically, an application provides a kernel address space identifier of driver A's kernel memory to device B driver. Device B driver uses the kernel address space identifier to obtain a cookie structure that binds the driver A's kernel memory to device A driver's address space. The application sends a request for direct memory access (DMA) operation to device B driver. The request includes a location identifier that identifies the location of a data object in device A driver's kernel memory. Based on the cookie structure, device B driver obtains device A driver's address corresponding to the location identifier and performs the DMA operation. Embodiments of the invention may allow direct access to data, thereby reducing latency and data integrity issues resulting from creating multiple copies of the data.

One or more embodiments of the invention use mappings between different address spaces in order to perform the DMA operation. An address space is a range of addresses used to identify locations in memory. By way of an introduction, locations in kernel memory may be referenced by multiple different addresses. Specifically, each of the multiple different addresses may be used to uniquely identify a particular location. For example, a device driver address is an address used by a device driver to reference the location. Each device driver has a device driver address space that the corresponding device driver uses to reference locations. Amongst device driver addresses used by a particular device driver, each device driver address uniquely identifies the location. Device driver address is a virtual address of the physical address space. In one or more embodiments of the invention, device driver address spaces may be non-overlapping. Further, in one or more embodiments of the invention, the different device drivers may use different device driver addresses to reference the same memory location. For example, device driver A may use device driver address X to reference a memory location M and device driver B may use device driver address Y to reference the same memory location M.

Continuing with the introduction, the particular location may also be referenced by a kernel address. A kernel address is a physical address that is common across all device drivers. In other words, a particular location is uniquely identifiable solely by the kernel address. Thus, if a device driver address used by device driver X maps to the same kernel address as a device driver address used by device driver Y, then both device drivers are referencing the same memory location. Conversely, if a device driver address used by device driver X maps to a different kernel address than a device driver address used by device driver Y, than the device drivers are referencing different memory locations.

The particular location may also be referenced using a user virtual address. A user virtual address is an address used by a user level application. The user virtual address is a virtual address that an application uses to uniquely reference memory locations. Each user level application has a user virtual address space that the corresponding user level application uses to reference locations. User virtual address spaces may be overlapping between applications. In other words, application M may use the same user virtual address as application N to reference different locations in memory. However, an identifier of the application (i.e., process identifier) with the user virtual address uniquely identifies the particular location. Specifically, the user virtual address is uniquely identified to the driver by providing the kernel address identifier and the user process identifier. The kernel address identifier specifies the kernel memory location and allows the driver to bind to the memory and obtain a cookie structure which contains the virtual address that allows for the DMA.

FIG. 1 shows a schematic diagram of a host (100) in accordance with one or more embodiments of the invention. As shown in FIG. 1, the host (100) may include a central processing unit (CPU) (102), physical memory (104), bus (108), and any number of devices A-N (110A-110N). In one or more embodiments, the CPU (102) is a hardware processor component for processing instructions of the host (100). The CPU (102) may include multiple hardware processors. Optionally, each hardware processor may include multiple processing cores. Generally, the CPU (102) may be any device configured to execute instructions on the host (100). The physical memory (104) may be any type of hardware device configured to store data. In one or more embodiments, the physical memory (104) may be used to store instructions and parameters for execution by the CPU (102).

In one or more embodiments, the bus (108) may be any bus (or buses) used by the host (100) as a communication channel that interconnects the components of the host (100). For example, the bus (108) may be an Industry Standard Architecture (ISA) bus, a Peripheral Component Interconnect (PCI) bus, a Peripheral Component Interconnect Express (PCIe) bus, a Universal Serial Bus (USB), a Small Computer System Interface (SCSI) bus, and the like.

In one or more embodiments, each device (110) may be a resource used by programs executing on the host (100) for information input and/or information output (I/O). Examples of devices (110) may include, but are not limited to, disk drives, network interface cards, graphics cards, sound cards, etc. In one or more embodiments, each device (110) may include a Direct Memory Access (DMA) controller (not shown). In one or more embodiments, a DMA controller is a hardware dedicated to transferring data between memory locations on a system. For example, the DMA controller may transfer data from a buffer on the device (110) to/from a location in physical memory (104). In one or more embodiments, each DMA controller may receive instructions from a device driver (not shown) for the device (110) in which the DMA controller is included.

FIGS. 2A-2E show an example data transfer operation, in accordance with one or more embodiments of the invention. Specifically, FIGS. 2A-2E show an example of a device B (110B) accessing a data object (230) stored in a virtual memory (200) at various points in time. Further, the example shown in FIGS. 2A-2E is simplified for the sake of illustration, and is not intended to limit the invention.

Figure 2A:
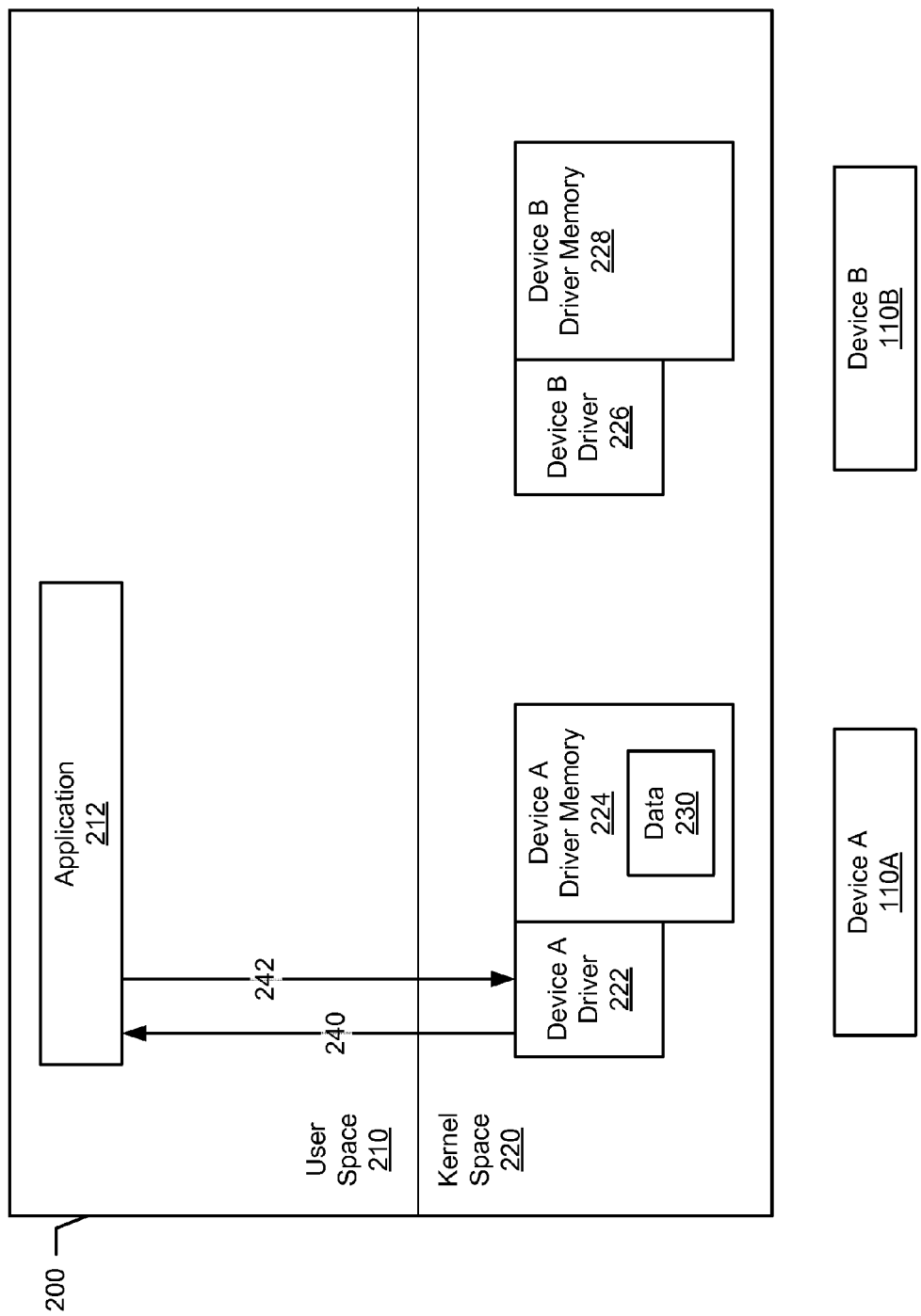

FIG. 2A shows an initial stage of the data transfer operation in accordance with one or more embodiments. As shown, the virtual memory (200) may include a user space (210) and a kernel space (220). In one or more embodiments, the virtual memory (200) provides a contiguous view of storage. The virtual memory (200) maps to locations in the physical memory (104 in FIG. 1). For example, each address in the virtual memory (200) may be mapped to a location in the physical memory (104) using a translation lookaside buffer, a page table, and the like (not shown). As discussed above, different address spaces (e.g., device driver address space, user virtual address space, kernel address space) may be used to reference locations in virtual memory, and subsequently to physical memory.

In one or more embodiments, the kernel space (220) is the portion of the virtual memory (200) that is reserved for running the kernel of the host (100). For example, as shown in FIG. 2A, the kernel space (220) includes device A driver (222) representing a device driver to enable the kernel to interact with device A (110A). The kernel space (220) also includes device B driver (226) representing a device driver to enable the kernel to interact with device B (110B). Further, in one or more embodiments, the kernel space (220) also includes device A driver memory (224) and device B driver memory (228), which are memory spaces dedicated for use by device A driver (222) and device B driver (226), respectively.

In one or more embodiments, the user space (210) is the portion of the virtual memory (200) that is reserved for running user applications. For example, as shown in FIG. 2A, the user space (210) includes an application (212) representing a user application executing on the host (100). Assume that the data object (230) is data used by device A driver (222), and is thus stored in device A driver memory (224). Assume further that the application (212) requires device B (110B) to access the data object (230).

As shown in FIG. 2A, in one or more embodiments, the application (212) may request (242) a kernel address space identifier of driver A's kernel memory from device A driver (222). The kernel address space identifier identifies all memory allocated to device A driver. Alternatively, the kernel address space identifier may include only the portion of device A driver's memory that the application has permission to access. For example, the kernel address space identifier may be a starting address and a length, a starting address and an ending address, or another mechanism for identifying driver A's kernel memory in the kernel address space. In response, device A driver (222) may send (240) the kernel address space identifier to the application (212).

Figure 2B:
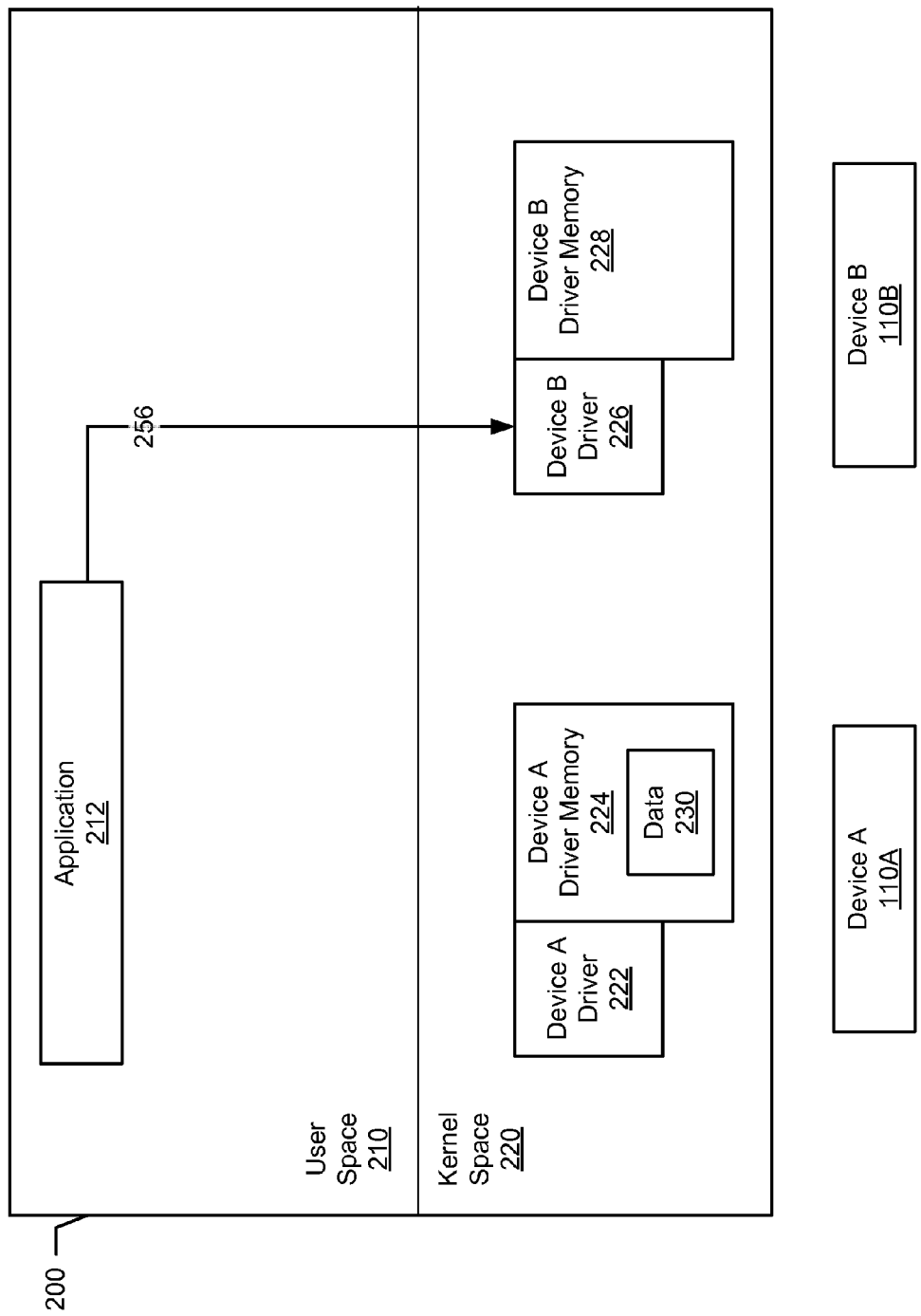

FIG. 2B shows a second stage of the data transfer operation in accordance with one or more embodiments. As shown, the application (212) may send (256) the kernel address space identifier to device B driver (226). Thus, device B driver (226) has the location in kernel space of device A driver memory (224).

Figure 2C:
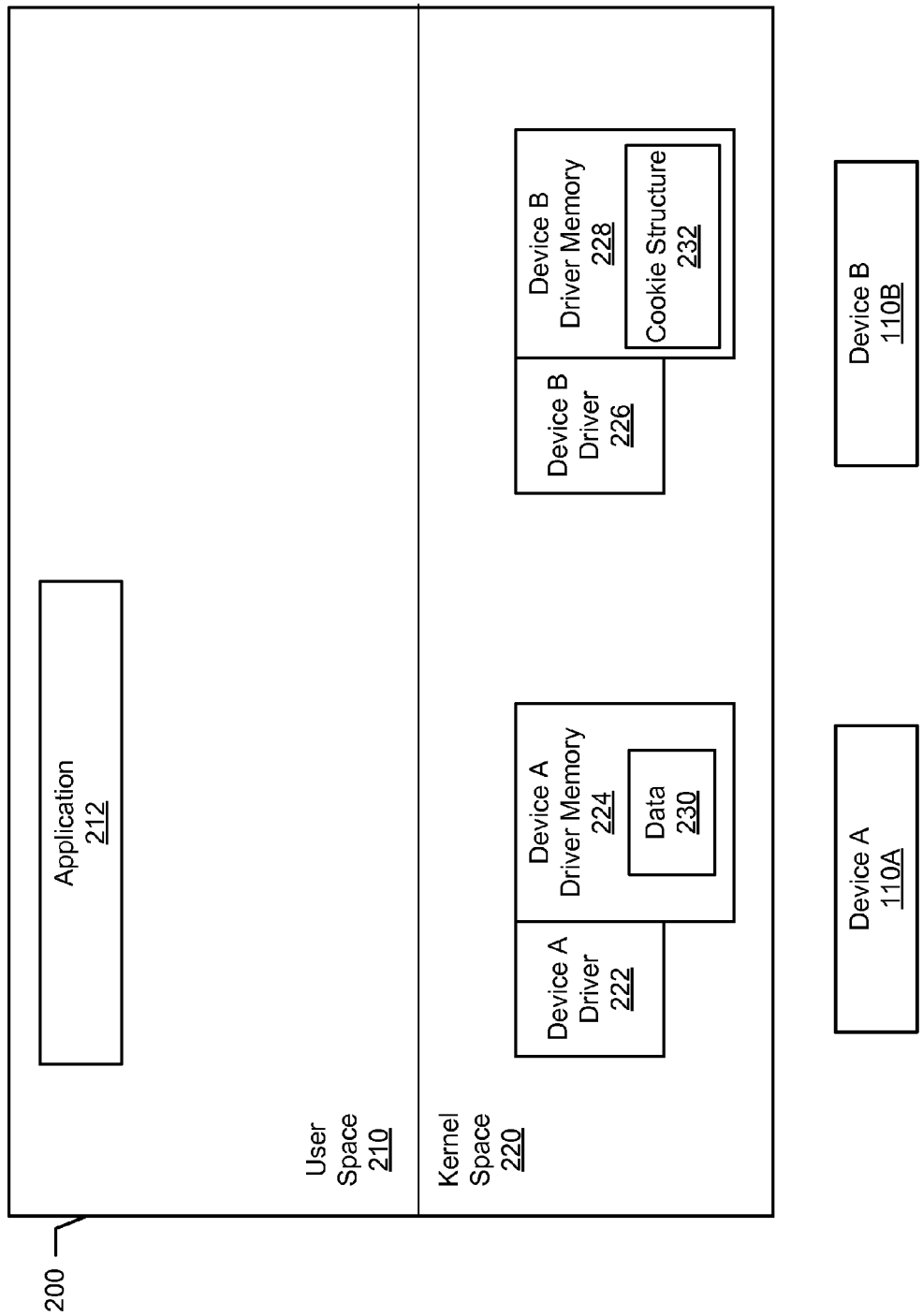

Turning to FIG. 2C, in one or more embodiments, device B driver (226) may use the kernel address space identifier address to obtain the device B driver address space, used by device B driver, of the device A driver memory (224). For example, in one or more embodiments, device B driver (226) may determine the device B driver address by obtaining a DMA handle, binding the kernel address space in the kernel address space identifier to the DMA handle, and obtaining a DMA cookie structure (232) (i.e., a data structure storing memory address information) including the device B driver address space corresponding to device A driver memory. For example, in the situation that the host (100) uses the Solaris™ operating system (OS), device B driver (226) may perform the "ddi_dma_alloc_handle" command to obtain a DMA handle, and may perform the "ddi_dma_addr_bind_handle" command to bind the data to the DMA handle (Solaris is a trademark of Oracle America, Inc). In one or more embodiments of the invention, at this stage, device B driver has a mapping between the kernel address space and device B driver address space for device A driver kernel memory.

Figure 4A:
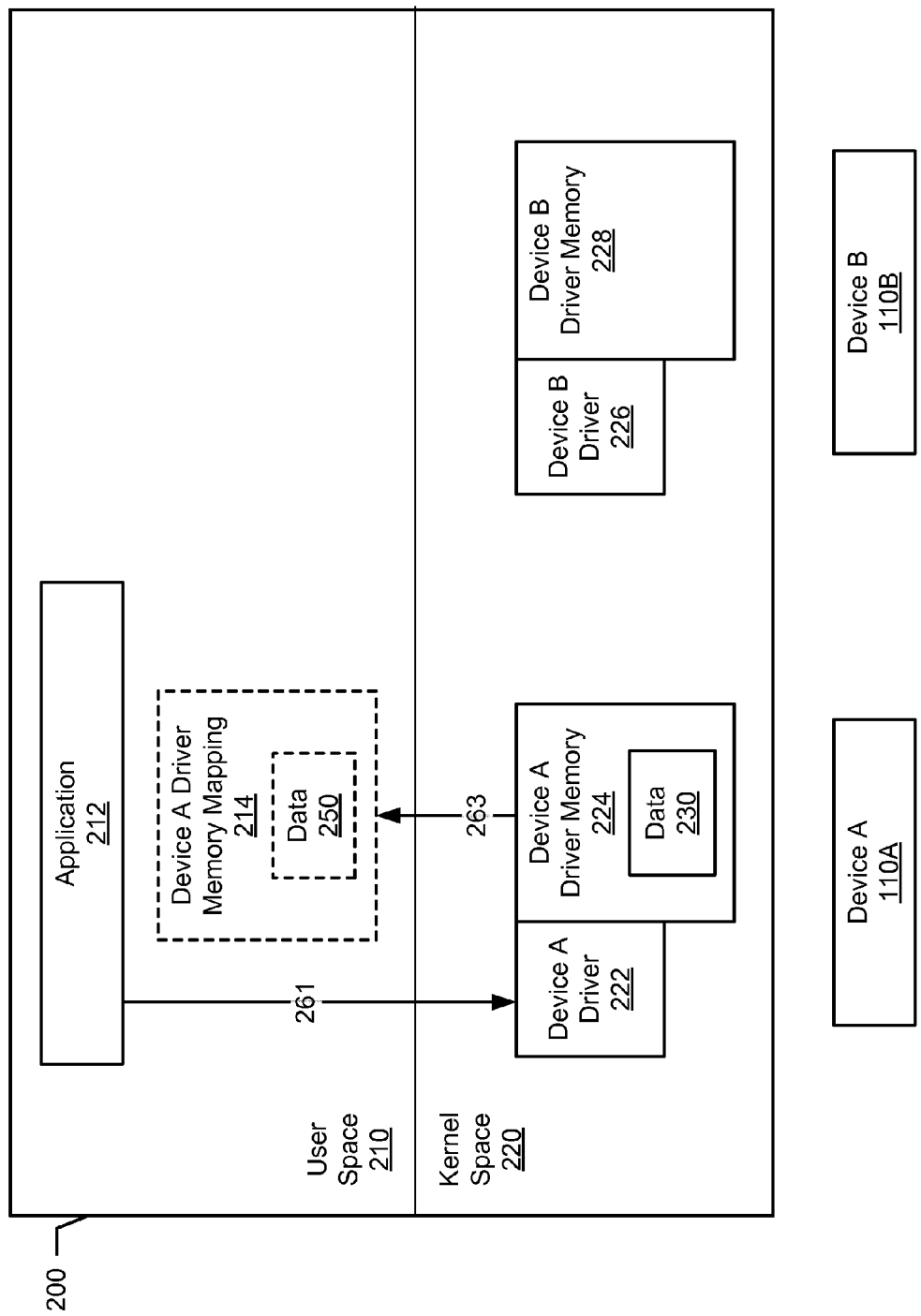
FIGS. 4A-4F show an example in accordance with one or more embodiments of the invention.
Figure 4B:
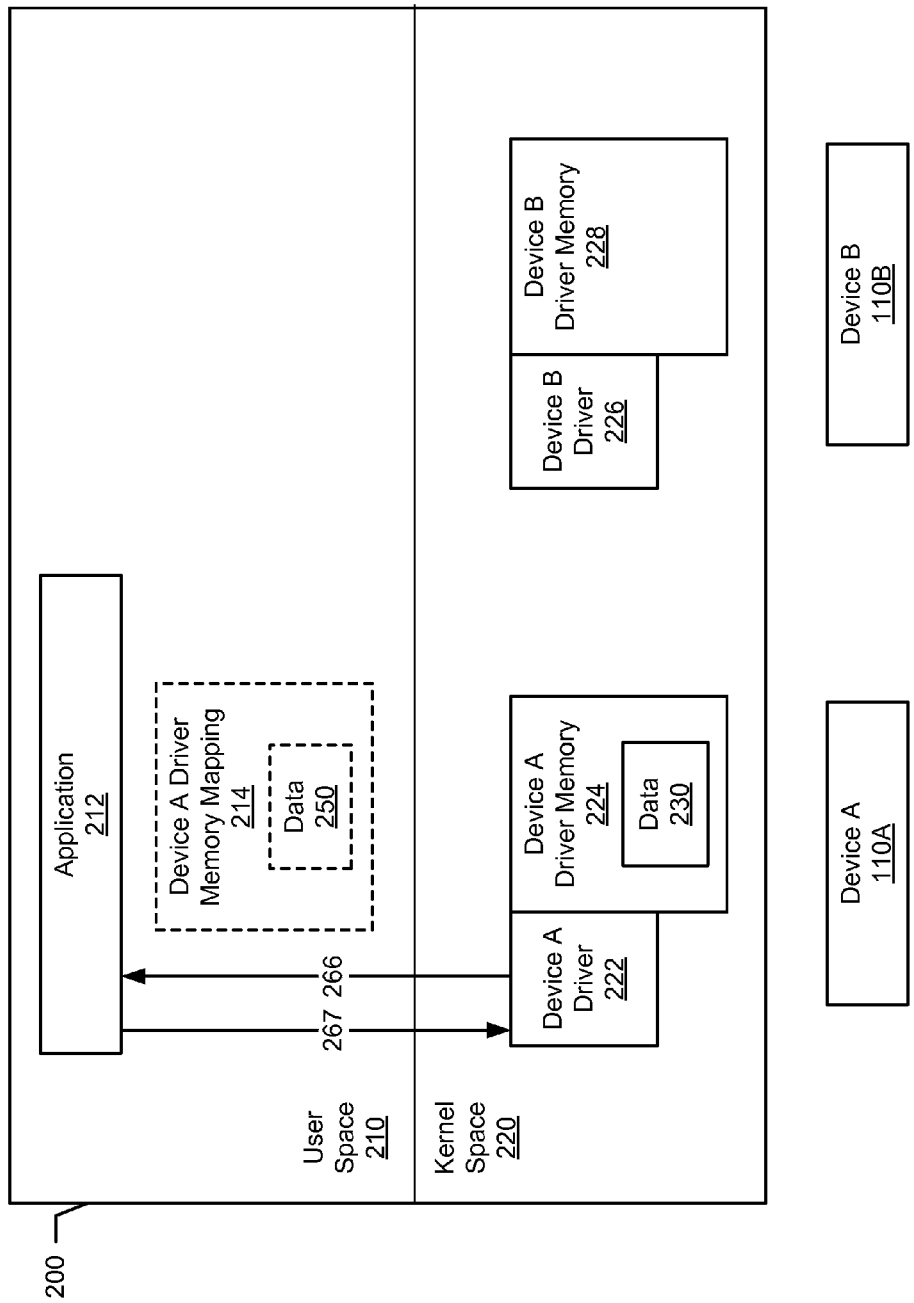

FIG. 2D shows a next stage of the data transfer operation in accordance with one or more embodiments. As shown, the application (212) may send a request (258) that includes a location identifier for a data object. In one or more embodiments of the invention, the location identifier may be a starting address and a length of the data object, a starting address and an ending address, or another method for identifying the data object. In one or more embodiments of the invention, the address provided by the application may be a user virtual address in the user virtual address space, a kernel address in the kernel address space, or another address. FIGS. 4A-4B provide an example for when the application provides a user virtual address in one or more embodiments of the invention.

Figure 2E:
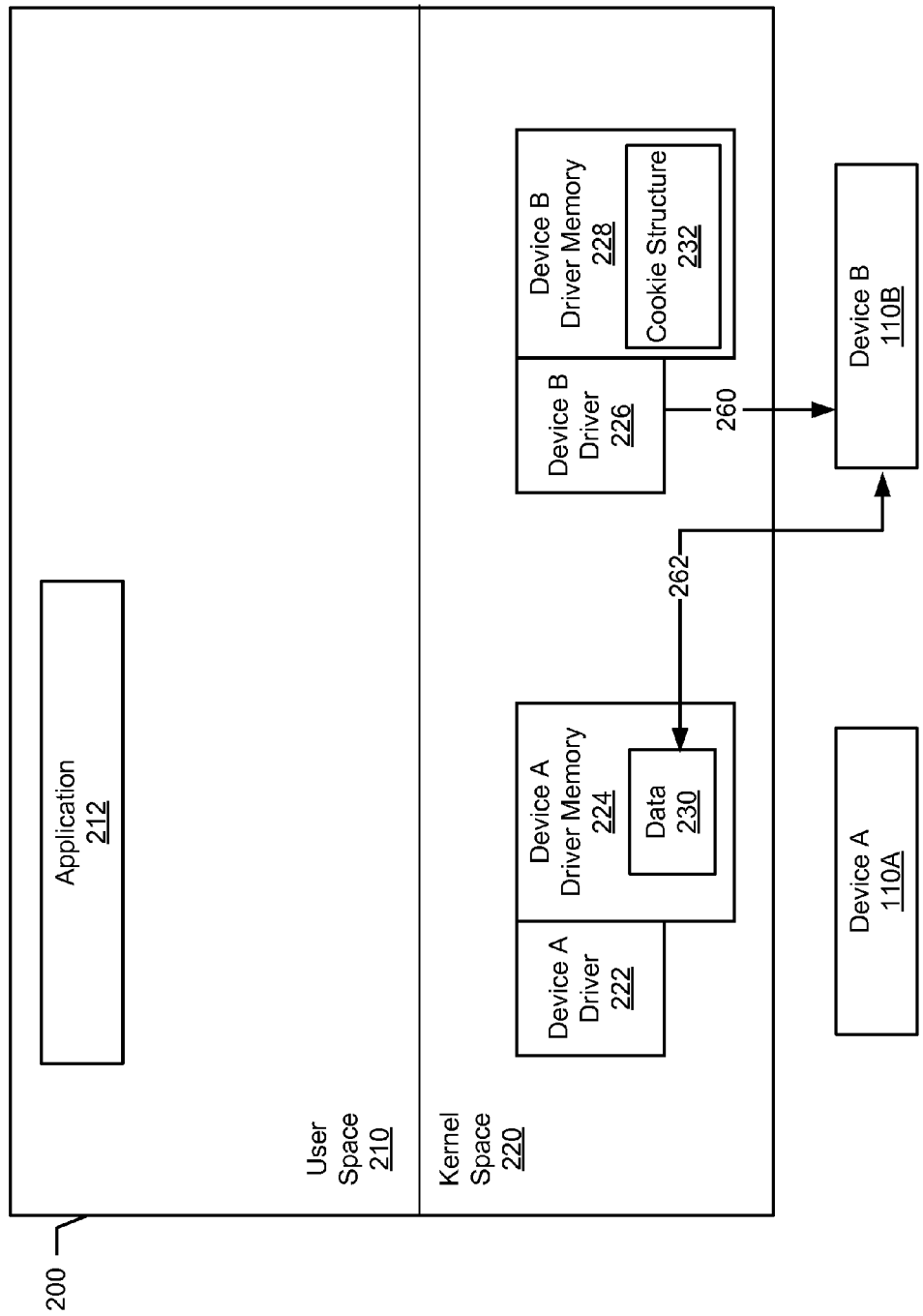

Continuing with the example in FIGS. 2A-2E, in FIG. 2E, based on the cookie structure, device B driver (226) performs the DMA operation to transfer the data object (230) from device A kernel memory (224) to device B kernel memory (228). Specifically, device B driver (226) may obtain the device B address and length of data object based on the cookie structure (232). Device B driver (226) may send (260) the device B driver address in the device B driver address space. Device B driver (226) may also send (260) the data length of the data object to device B (110B). In one or more embodiments, device B (110B) may use the device B driver address and the data length to establish a direct connection (262) to the data object (230). For example, device B (110B) may use the direct connection (262) to read from and/or write to the data object (230) stored in device A driver memory (224). In one or more embodiments, the direct connection (262) may be a DMA connection. Further, in one or more embodiments, the physical memory address may be a Peripheral Component Interconnect Express (PCIe) endpoint.

Figure 3:
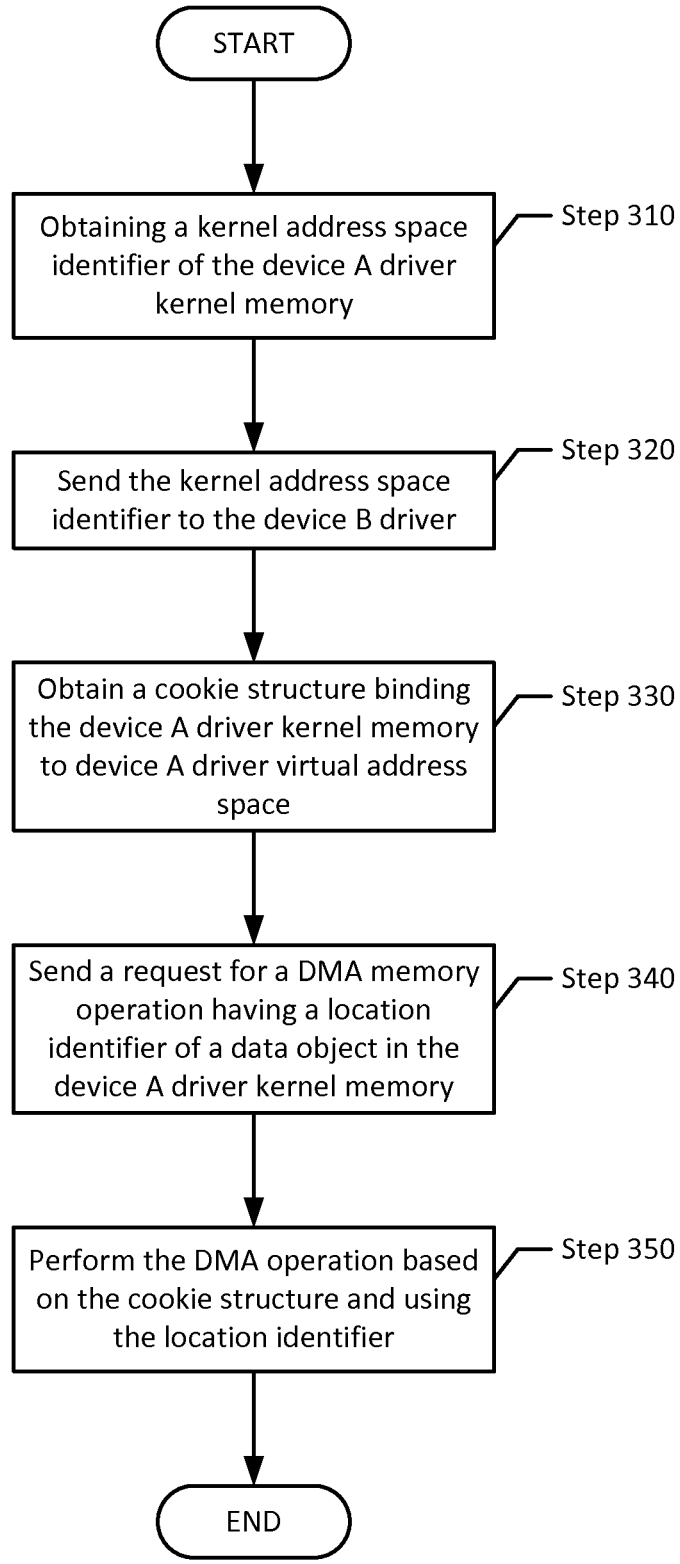
FIG. 3 shows a flowchart in accordance with one or more embodiments of the invention.

FIG. 3 shows a flowchart of a method for a data transfer operation, in accordance with one or more embodiments of the invention. In one or more embodiments, the process shown in FIG. 3 may correspond to the software environments described above with reference to FIGS. 2A-2E. Those skilled in the art, having the benefit of this detailed description, will appreciate that the sequence of steps shown in FIG. 3 may differ among embodiments of the invention, and that one or more of the steps shown in FIG. 3 may be omitted, repeated, performed in parallel, and/or performed in a different order. Accordingly, the specific arrangement of steps shown in FIG. 3 should not be construed as limiting the scope of the invention.

In one or more embodiments, the method shown in FIG. 3 may enable a second device (e.g., device B (110B) shown in FIG. 2A) to directly access data stored in the driver memory for a first device (e.g., device A driver memory (224) shown in FIG. 2A). At Step 310, the kernel address space identifier is obtained. For example, referring to FIG. 2A, the application (212) may obtain the kernel address space identifier from device A driver (222).

At Step 320, the kernel address space identifier is provided to the device driver of the second device. For example, referring to FIG. 2B, the application (212) may send the kernel address space identifier to device B driver (226).

At Step 330, a cookie structure binding the device A driver kernel memory to device B driver address space is obtained. Specifically, the device B driver address space identifier corresponding to the kernel address space identifier may be determined. In one or more embodiments, the device B driver (226) may determine the device B driver address space by obtaining a DMA handle, binding the data to the DMA handle, and obtaining a DMA cookie structure that includes the device B driver address space. At this stage, device B driver has a mechanism, provided by the kernel, for accessing device A driver memory that is allocated to device A driver.

At Step 340, the application sends a request for a DMA memory operation having a location of a data object in the device A driver kernel memory. Specifically, the application may issue a call to device B driver with arguments having or referencing a location identifier for the data object.

At Step 350, the DMA is performed based on the cookie structure and using the location identifier. In one or more embodiments of the invention, the device B driver virtual address corresponding to the data object may be identified based on the cookie structure. For example, referring to FIG.

2D, device B driver (226) sends the device B driver virtual address of the data object (230) to the device B (110B). The device B may directly access the data using the device B driver address. For example, referring to FIG. 2E, device B (110B) may directly access the data object (230) stored in device A driver memory (224). In one or more embodiments, the device B (110B) may include a DMA controller, and may use the physical memory address to establish a DMA connection to the data object (230). After Step 350, the process ends.

FIGS. 4A-4E show an example data transfer operation, in accordance with one or more embodiments of the invention. Specifically, FIGS. 4A-4E show a second example of a device B (110B) accessing a data object (230) stored in a virtual memory (200) at various points in time. FIGS. 4A-4E show an example for the application to use a user virtual address as the location identifier to reference the data object. Those of skill in the art will recognize that the example shown in FIGS. 4A-4E are simplified for the sake of illustration, and are not intended to limit the invention.

FIG. 4A shows an example operation in accordance with one or more embodiments. As shown in FIG. 4A, the application (212) sends a first request (261) requesting a mapping to device A driver memory (224). In response, device A driver (222) may perform a memory mapping (263) of device A driver memory (224) into user space (210) to obtain a device A driver memory mapping (214) (i.e., a mapped user space). In one or more embodiments, the device A driver memory mapping (214) is uniquely associated with the application (212). As shown, the device A driver memory mapping (214) may include a data copy (250) (i.e., a copy of the data object (230)).

FIG. 4B shows another stage of the example operation in accordance with one or more embodiments. As shown in FIG. 4B, in one or more embodiments, the application (212) may request (267) a kernel address space identifier of driver A's kernel memory from device A driver (222). The kernel address space identifier identifies all memory allocated to device A driver. Alternatively, the kernel address space identifier may include only the portion of device A driver's memory that the application has permission to access. For example, the kernel address space identifier may be a starting address and a length, a starting address and an ending address, or another mechanism for identifying driver A's kernel memory in the kernel address space. In response, device A driver (222) may send (266) the kernel address space identifier to the application (212).

Figure 4C:
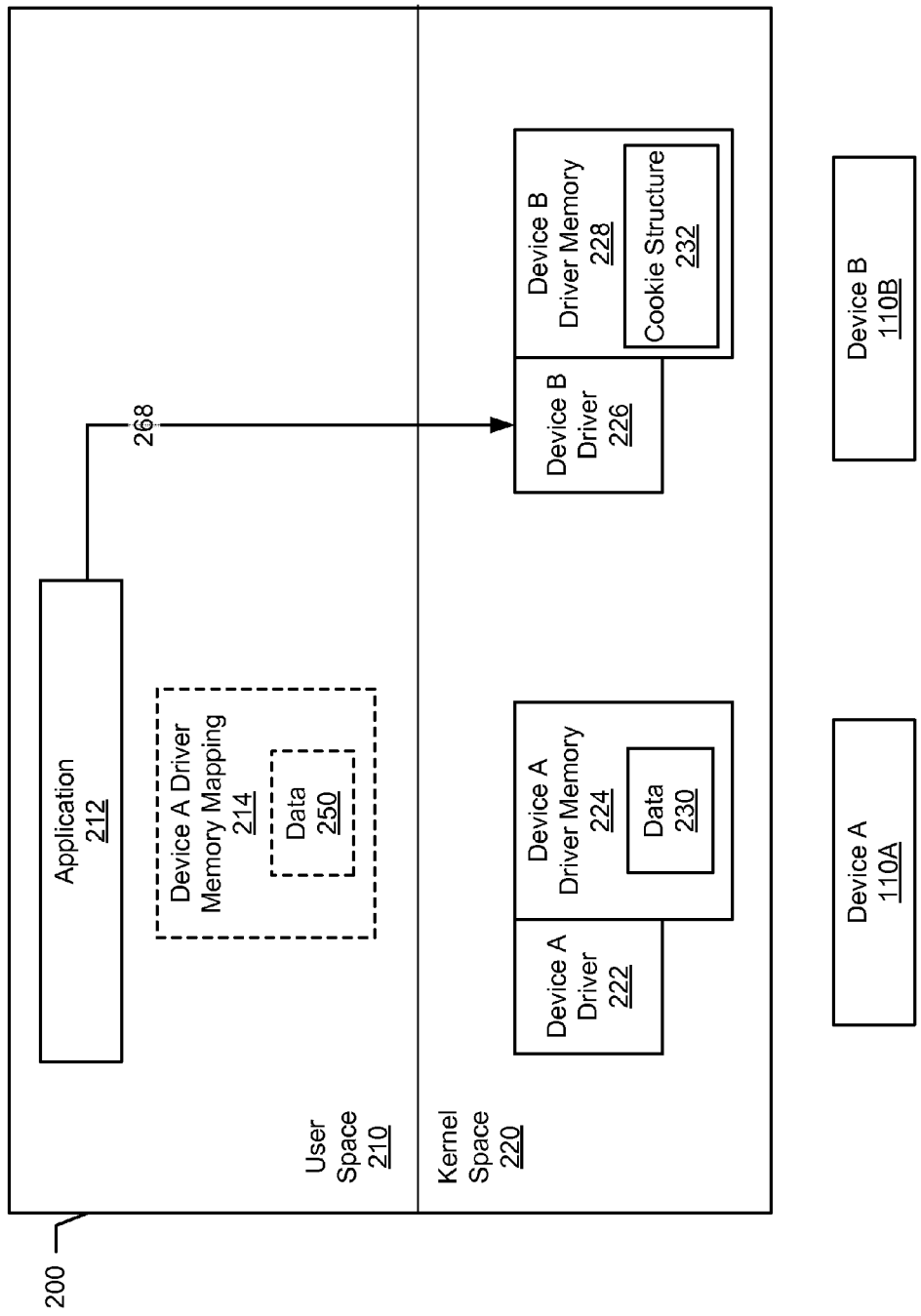

FIG. 4C shows a next stage of the data transfer operation in accordance with one or more embodiments. As shown, the application (212) may send (268) the kernel address space identifier to device B driver (226). Thus, device B driver (226) has the location in kernel space of device A driver memory (224). Similar to FIG. 2C, in one or more embodiments, device B driver (226) may use the kernel address space identifier address to obtain the device B driver address, used by device B driver, of the device A driver memory (224). Further, in one or more embodiments, device B driver (226) may obtain the device B driver address by obtaining a DMA handle, binding the kernel address space in the kernel address space identifier to the DMA handle, and obtaining a DMA cookie structure (232) (i.e., a data structure storing memory address information) including the device B driver address space corresponding to device A driver memory. For example, in the situation that the host (100) uses the Solaris™ operating system (OS), device B driver (226) may perform the "ddi_dma_alloc_handle" command to obtain a DMA handle, and may perform the "ddi_dma_addr_bind_handle" command to bind the data to the DMA handle (Solaris is a trademark of Oracle America, Inc). In one or more embodiments of the invention, at this stage, device B driver has a mapping between the kernel address space and device B driver address space for device A driver kernel memory.

Figure 4D:
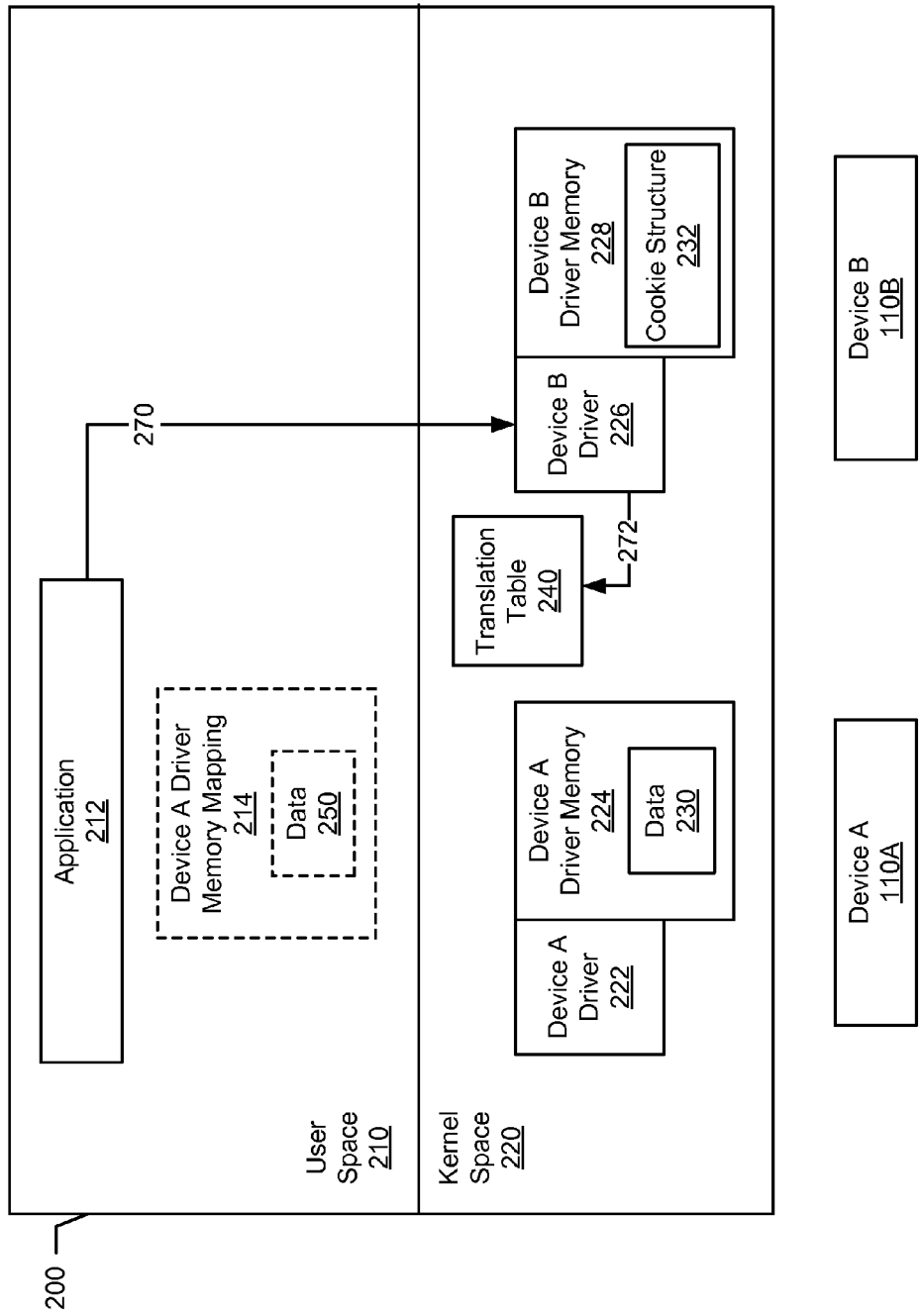
Figure 4E:
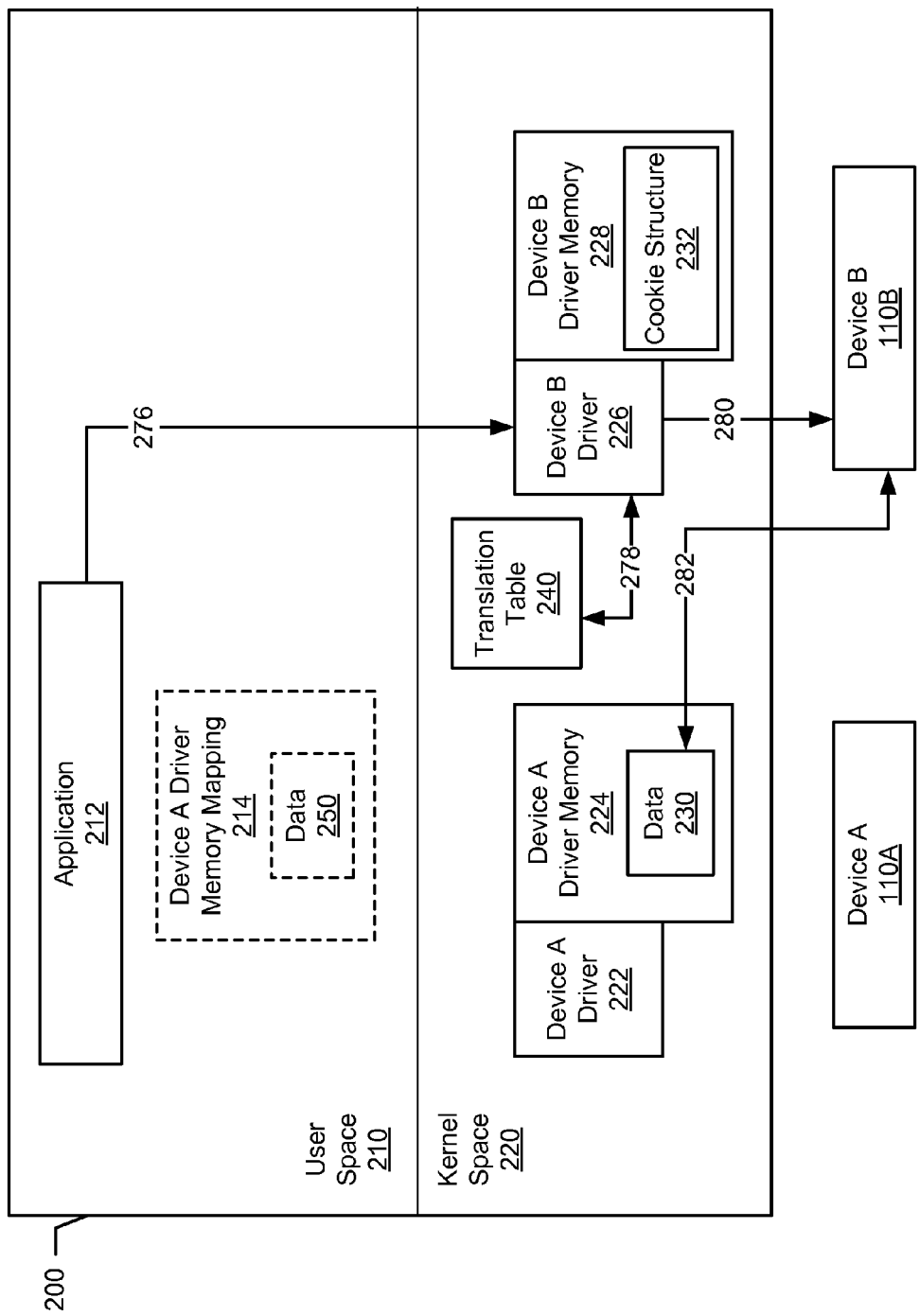

FIG. 4D shows a next stage of the example operation in accordance with one or more embodiments. As shown, the application (212) may send (270) the kernel address space identifier for device A driver memory (224), the user virtual address space identifier, and a process identifier (i.e., a unique identifier for the application (212)) to device B driver (226). In one or more embodiments of the invention, the kernel address space identifier may be the same or different than the kernel address space identifier provided in FIG. 4C. For example, the kernel address space identifier provided in FIG. 4D may reference a subset of device driver A memory (224), whereas the kernel space address identifier provided in FIG. 4C may reference the entire device A driver memory (224).

In one or more embodiments of the invention, the kernel address space identifier may be a starting address and length, a starting address and ending address, or another mechanism for identifying the device A driver memory (224) to be mapped. The user virtual address space identifier identifies the user virtual address space that maps to the kernel address space identifier provided in FIG. 4D. Specifically, addresses in the range the user virtual address space identifies the same locations as addresses in range identified by the kernel address space identifier provided in FIG. 4D. Similar to the kernel address space identifier, the user virtual address space identifier may be a starting address and length, a starting address and ending address, or another mechanism for identifying the corresponding user virtual address space.

In one or more embodiments, device B driver (226) may generate or update (272) a translation table (240) to include a mapping between the device driver B address space, the user virtual address space, and the process identifier. In one or more embodiments of the invention, the mapping is generated by accessing the cookie structure with the kernel address space identifier identified in FIG. 4D. As discussed above, the cookie structure identifies the device B driver address space for a corresponding kernel address space. Accordingly, by accessing the cookie structure with the kernel address space identifier, the device B driver address space for the device A driver memory may be identified. In one or more embodiments of the invention, if the length of the kernel address space identified in FIG. 4D is less than the length of the kernel address space identified in FIG. 4C, then the device B driver address space in the translation table is set as the smaller length. An example embodiment of the translation table (240) is described below with reference to FIG. 6.

FIG. 6 shows an example of translation table (620) in accordance with one or more embodiments of the invention. As shown in FIG. 6, the translation table (620) may include, by way of example, one or more mappings between process identifiers (e.g., $ID_1$-$ID_N$) with user virtual addresses (e.g., $UA_1$-$UA_n$), and driver addresses (e.g., $DA_1$-$DA_n$). The driver addresses (e.g., $DA_1$-$DA_n$) are the addresses used by device B driver to reference device A driver memory. In one or more embodiments of the invention, the addresses used by device B driver to reference device A driver memory may be different than the addresses used by device A driver to reference device A driver memory. Each address in the translation table may be an individual address or an address space identifier (i.e., to identify a range of addresses).

Continuing with the example of FIG. 4A-4F, FIG. 4E shows a next stage for performing the direct memory access in one or more embodiments of the invention. As shown, the application (212) may send a request (276) that includes a location identifier for a data object. In the example shown in FIG. 4E, the location identifier is a user virtual address, for the data object, in the user virtual address space. In other words, the location is specified in a manner that a user-level application normally references memory. In one or more embodiments of the invention, the location identifier may be a starting address and a length of the data object, a starting address and an ending address of the data object, or another method for identifying the data object. In one or more embodiments of the invention, a process identifier is sent with the request (276) to the device B driver (226).

Based on the cookie structure and using the location identifier, device B driver (226) performs the DMA operation to transfer the data object (230) from device A kernel memory (224) to device B kernel memory (228). In particular, device B driver (226) uses the translation table (240) that was generated or updated using the cookie structure in FIG. 4D. Specifically, device B driver (226) performs a lookup (278) in the translation table to obtain the device B driver address corresponding to the user virtual address and process identifier provided by the request (276). In one or more embodiments of the invention, as part of or prior to performing the lookup in the translation table (240), the device B driver (226) may confirm with the kernel that the application (212) has necessary privileges to access the address space having the data object.

Device B driver (226) may send (280) the device B driver address in device B driver address space and the data length to device B (110B). In one or more embodiments, device B (110B) may use the device B driver address and the data length to establish a direct connection (282) to the data object (230). For example, device B (110B) may use the direct connection (282) to read from and/or write to the data object (230) stored in device A driver memory (224). In one or more embodiments, the direct connection (282) may be a DMA connection. Further, in one or more embodiments, the physical memory address may be a Peripheral Component Interconnect Express (PCIe) endpoint.

Figure 4F:
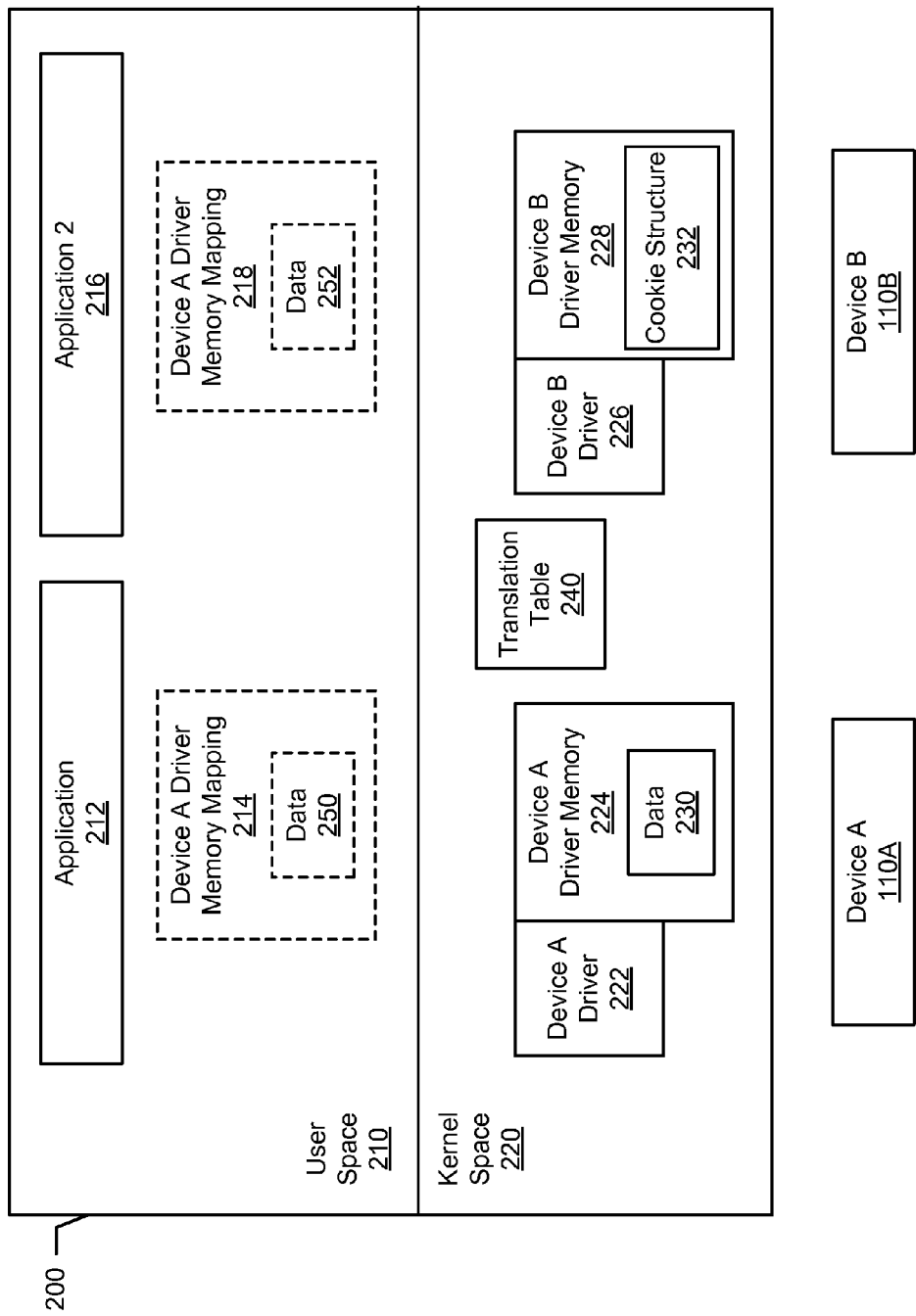

FIG. 4F shows another stage of the example operation in accordance with one or more embodiments. Specifically, FIG. 4F shows an example in which a second application (216) also requires device B (110B) to directly access the data object (230). In such a situation, device A driver memory (224) is memory mapped into the user space (210) to obtain a second device A driver memory mapping (218) including a second data copy (252) (i.e., a second copy of the data object (230)). In one or more embodiments, the second device A driver memory mapping (218) is uniquely associated with the second application (216).

In one or more embodiments, the translation table (240) may be updated to include a mapping associated with the second application (216). Stated differently, the translation table (240) includes mappings of the user virtual addresses used by the two applications (212, 216) to a shared data object in kernel memory. Accordingly, thereafter, the two applications (212, 216) can request direct access to the data object (230) using their respective user memory addresses. In one or more embodiments of the invention, once a translation table is generated, if the second application (216) also requests DMA for device B to device A, the second application can also use the same translation table. In such a scenario, the second application only provides a user address space identifier, process identifier, and kernel address space identifier to device B driver to update the translation table (240). In other words, the second application does not need to perform the steps of FIGS. 4B and 4E to create the cookie structure if the cookie structure is already generated for the first application and the same or a subset of the memory referenced by the cookie structure is requested.

Figure 5A:
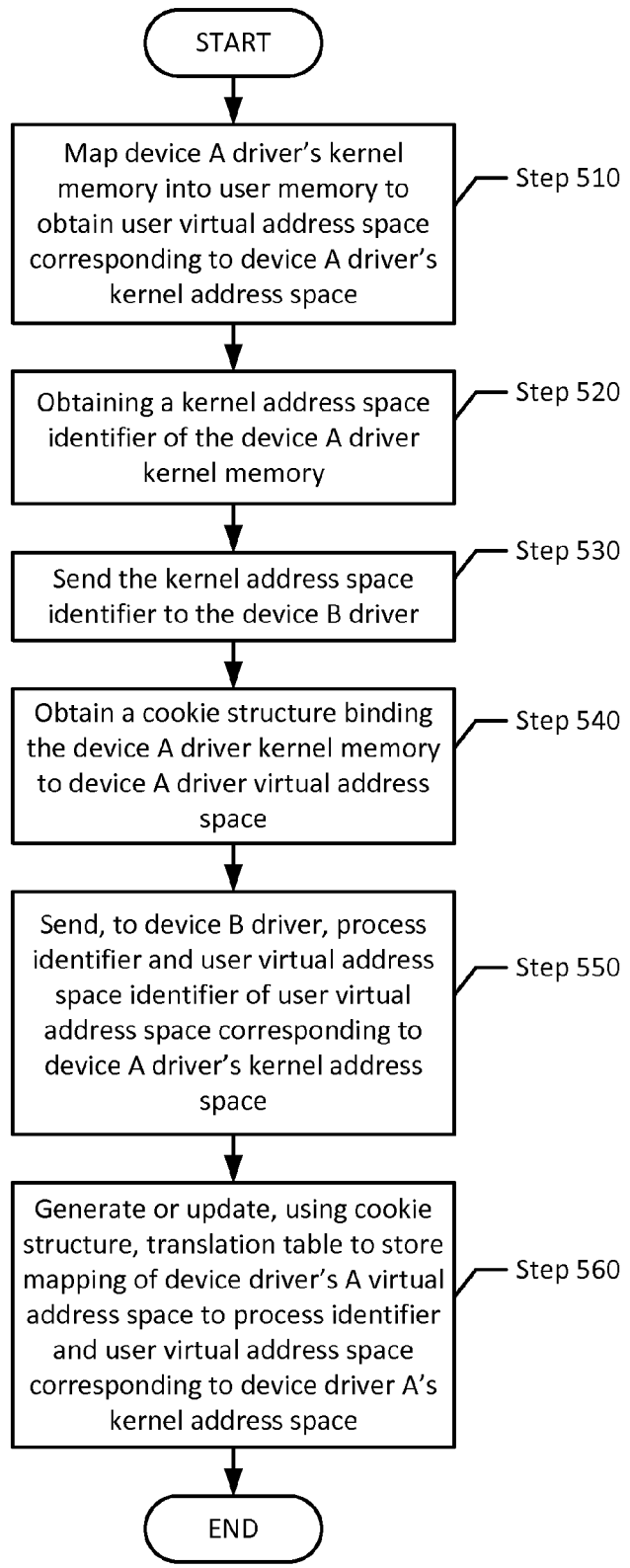
FIGS. 5A-5B show flowcharts in accordance with one or more embodiments of the invention.
Figure 5B:
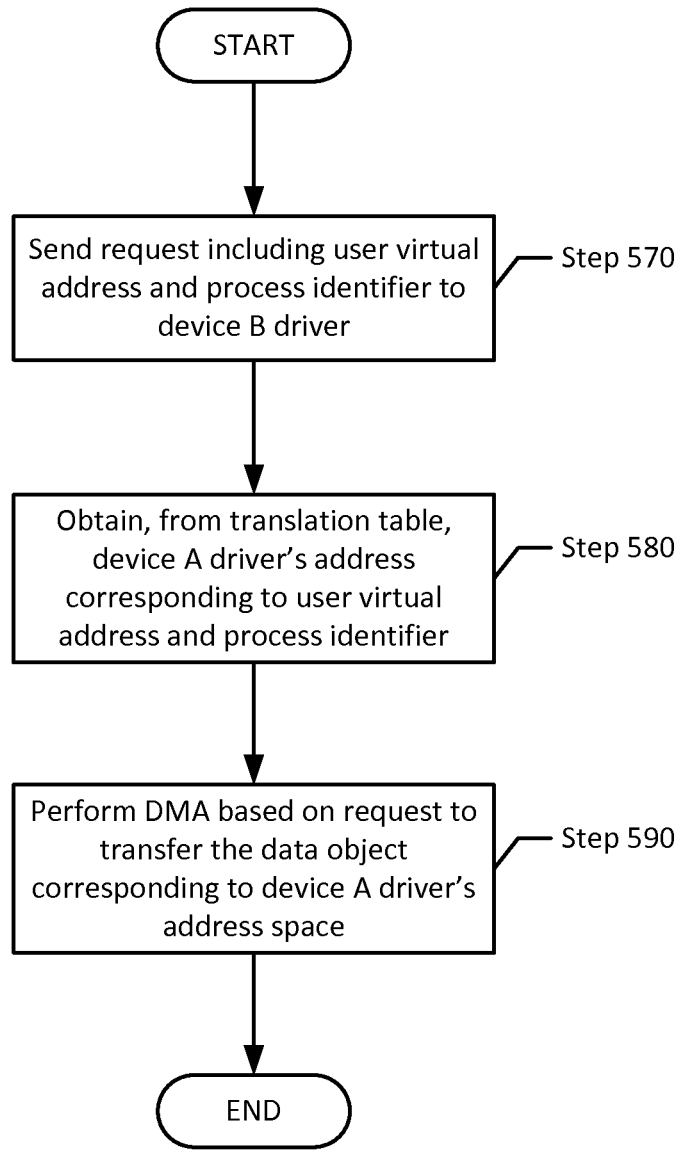

FIGS. 5A-5B show flowcharts of a method for a data transfer operation, in accordance with one or more embodiments of the invention. In one or more embodiments, the processes shown in FIGS. 5A-5B may correspond to the software environments described above with reference to FIGS. 4A-4E. Those skilled in the art, having the benefit of this detailed description, will appreciate that the sequence of steps shown in FIGS. 5A-5B may differ among embodiments of the invention, and that one or more of the steps shown in FIGS. 5A-5B may be omitted, repeated, performed in parallel, and/or performed in a different order. Accordingly, the specific arrangement of steps shown in FIGS. 5A-5B should not be construed as limiting the scope of the invention.

FIG. 5A shows a flowchart of a method for updating a translation table, in accordance with one or more embodiments of the invention. At Step 510, the first driver kernel memory (i.e., the portion of kernel memory allocated to a first device driver) may be mapped from kernel space into user space. The first device driver may be a driver for a first I/O device, and the mapped memory may include a data object that is to be directly accessed by a second device. For example, referring to FIG. 4A, device A driver (222) may perform a memory mapping of the device A driver memory (224) into user space (210) to obtain a device A driver memory mapping (214). In one or more embodiments, in the SOLARIS™ operating system, the memory mapping may be performed using the "mmap" command. (SOLARIS™ is a trademark of Oracle America, Inc. located in Redwood City, Calif.).

At Step 520, the kernel address space identifier is obtained. For example, referring to FIG. 4B, the application (212) may obtain the kernel address space identifier from device A driver (222).

At Step 530, the kernel address space identifier is provided to the device driver of the second device. For example, referring to FIG. 4C, the application (212) may send the kernel address space identifier to device B driver (226).

At Step 540, a cookie structure binding the device A driver kernel memory to device B driver virtual address space is obtained. Specifically, the device B driver address space identifier corresponding to the kernel address space identifier may be determined. In one or more embodiments, the device B driver (226) may determine the device B driver virtual address space for device A driver memory by obtaining a DMA handle, binding the data to the DMA handle, and obtaining a DMA cookie structure that includes the device B driver virtual address space information for device A driver kernel memory.

At Step 550, the application sends to device B driver a process identifier and user virtual address space identifier of user virtual address space corresponding to device A driver's kernel address space. The application may also include in the message device A driver's kernel address space identifier or an identifier of a subset of device A driver's kernel address space. For example, referring to FIG. 4C, the application (212) sends a message (268) to device B driver (226) that receives the message.

At Step 560, using the cookie structure from Step 540, the translation table is generated or updated to store mapping of device driver's B virtual address space to process identifier and user virtual address space corresponding to device driver A's kernel address space. Generating or updating the translation table may be performed as discussed above with reference to FIG. 4C. After Step 540, the process terminates.

Optionally, the updated translation table may be used to perform the requested data transfer (not shown in FIG. 5A).

FIG. 5B shows a flowchart of a method for using the updated translation table, in accordance with one or more embodiments of the invention. Specifically, assume that the method of FIG. 5B is performed subsequent to the method shown in FIG. 5A, when the application requests that a data object to be directly accessed by the driver of the second device.

At Step 570, the application sends a request including the process identifier and the user virtual address for the data object. The request may also include the length of the data object or another identifier of the size or the end of the data object. For example, referring to FIG. 4E, the application (212) sends the request (276) to the device B driver (226) to request that device B (110B) directly access the data object (230).

At Step 580, from the translation table, device B driver's virtual address is obtained that corresponds to user virtual address and process identifier. For example, referring to FIG. 4E, device B driver (226) performs a query (278) of the translation table (240), using the process identifier and the user virtual address included in the request (276), to determine the device B driver address of the data object (230).

At Step 590, DMA is performed based on request to transfer the data object corresponding to device B driver's address space. For example, referring to FIG. 4E, device B driver (226) may send (280) the device B driver address and the data length to device B (110B). The device B may access the data using the device B driver address and data length. For example, referring to FIG. 4E, device B (110B) may establish a direct connection (282) (e.g., a DMA connection) to the data object (230) using the device B driver address and the data length (received at Step 580). After Step 590, the process ends.

A person of skill in the art will note that the software environments shown in FIGS. 1, 2A-2E, 4A-4F, and 6 are exemplary embodiments, and are not intended to limit the invention. For example, for sake of clarity, FIGS. 2A-2E and 4A-4E show only two devices (110) and one application (212). However, it is contemplated that embodiments of the invention may include any number of devices and applications. In another example, in one or more embodiments, it is contemplated that any of the functionality described above with reference to the software components shown in FIGS. 1, 2A-2E, and 4A-4F may be implemented in any other software component. In yet another example, it is contemplated that the translation table (240) may be any data structure configured to store mappings.

Figure 7:
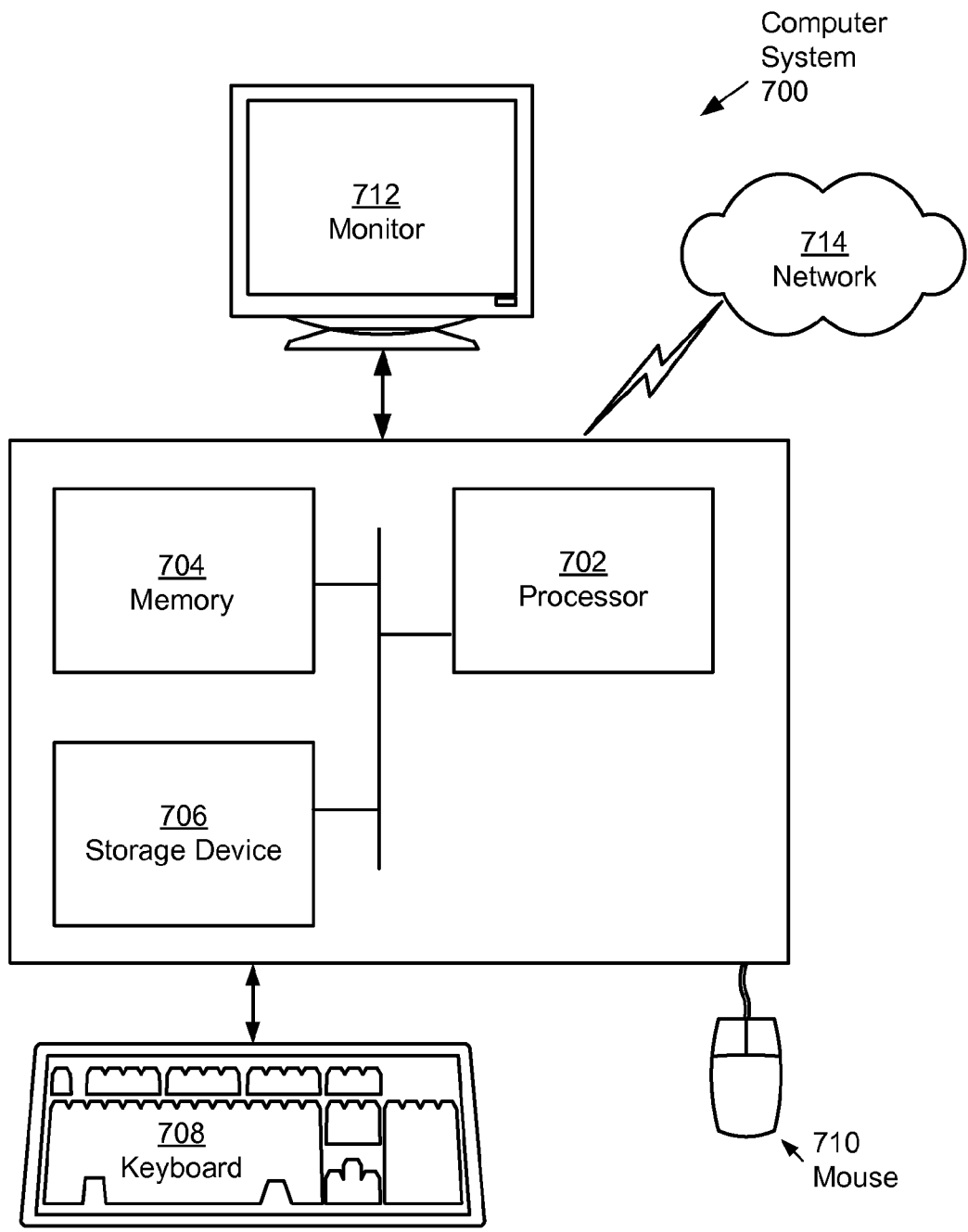
FIG. 7 shows a computer system in accordance with one or more embodiments of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a network (714) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

Embodiments of the invention may enable direct access to a data object without requiring multiple copies of the data object. Accordingly, embodiments of the invention may reduce latency and data integrity issues resulting from multiple copies of the data object. Further, in one or more embodiments, multiple applications may directly access a data object by referencing a user memory address that is unique to each application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing direct memory access, the method comprising:
   obtaining, by a first application executing on a host, a first kernel address space identifier of a first driver kernel memory, wherein the first driver kernel memory is a portion of kernel space allocated to a first device driver, and wherein the first device driver is for a first device operatively connected to a bus of the host;
   sending, by the first application, the first kernel address space identifier to a second device driver, wherein the second device driver is for a second device operatively connected to the bus of the host;
   obtaining, by the second device driver and using the first kernel address space identifier, a cookie structure binding the first driver kernel memory to a second device driver address space for the first driver kernel memory;
   sending, by the first application, a first request for a first direct memory access operation, wherein the first request comprises a first location identifier of a first location storing a first data object in the first driver kernel memory; and
   performing, by the second device driver, based on the cookie structure, and using the first location identifier, the first direct memory access operation to transfer the first data object from the first driver kernel memory to a second driver kernel memory, wherein the second driver kernel memory is a portion of kernel space allocated to the second device driver.

2. The method of claim 1, further comprising:
   sending, by the first application to the second device driver, a first user virtual address space identifier of a first user virtual address space corresponding to the first driver kernel memory; and generating, by the second device driver using the cookie structure, a translation table mapping the first user virtual address space to the second device driver address space,
wherein the first location identifier is a first user virtual address in the first user virtual address space, and
wherein performing the direct memory access operation uses the translation table generated based on the cookie structure.

3. The method of claim 2, wherein the first user virtual address space identifier comprises a starting address in the first user virtual address space and a length, wherein user virtual addresses within a range defined by the starting address and the length correspond to locations in the first driver kernel memory.

4. The method of claim 2, further comprising:
sending, by the first application to the second device driver, a process identifier of the first application,
wherein the translation table maps the first user virtual address space with the process identifier to the second device driver address space for the first driver kernel memory.

5. The method of claim 2, wherein performing the first direct memory access operation comprises:
translating, using the translation table, the first user virtual address to a driver address in the second device driver address space; and
requesting the first data object from the first device driver using the driver address.

6. The method of claim 2, further comprising:
sending, by a second application to the second device driver, a second user virtual address space identifier and a process identifier, where the second user virtual address space identifier identifies a second user virtual address space corresponding to the first driver kernel memory, and wherein the process identifier identifies the second application; and
updating, by the second device driver using the cookie structure and the second user virtual address space identifier, the translation table to map the second user virtual address space to the second device driver address space for the first driver kernel memory;
sending, by the second application, a second request for a second direct memory access operation, wherein the second request comprises a second user virtual address in the second user virtual address space, and wherein the second user virtual address references a second location storing a second data object in the first driver kernel memory; and
performing, by the second device driver, using the translation table, and the second user virtual address, the second direct memory access operation to transfer the second data object from the first driver kernel memory to the second driver kernel memory.

7. The method of claim 1, wherein the first kernel address space identifier comprises a starting address and a length of the first driver kernel memory.

8. A host, comprising:
a hardware processor;
a bus;
a first device operatively connected to the bus;
a second device operatively connected to the bus;
a physical memory, addressable by a virtual memory having a kernel space and a user space, comprising:
a first device driver, wherein the first driver is a device driver for the first device;
a first driver kernel memory corresponding to a portion of kernel space allocated to the first device driver, wherein the first driver kernel memory comprising a first data object, wherein the first data object is addressable by a kernel address, a driver address, and a first user virtual address;
a first application, configured to:
obtain a first kernel address space identifier of the first driver kernel memory;
send the first kernel address space identifier to a second device driver for a second device; and
send a first request for a first direct memory access operation, wherein the first request comprises a first location identifier of a first location storing a first data object in the first driver kernel memory; and
the second driver configured to:
obtain, using the first kernel address space identifier, a cookie structure binding the first driver kernel memory to a second device driver address space for the first driver kernel memory; and
perform, based on the cookie structure, and using the first location identifier, the first direct memory access operation to transfer the first data object from the first driver kernel memory to a second driver kernel memory, wherein the second driver kernel memory is a portion of kernel space allocated to the second device driver.

9. The host of claim 8, wherein the second device comprises a Direct Memory Access (DMA) controller.

10. The host of claim 8, wherein the DMA controller is configured to establish a DMA connection to access the first data object based on the first device virtual address.

11. The host of claim 8,
wherein the first application is further configure to:
sending, to the second device driver, a first user virtual address space identifier of a first user virtual address space corresponding to the first driver kernel memory, wherein the first location identifier is the first user virtual address in the first user virtual address space, and
wherein the second device driver is further configured to:
generate, using the cookie structure, a translation table mapping the first user virtual address space to the second device driver address space,
wherein performing the direct memory access operation uses the translation table generated based on the cookie structure.

12. The host of claim 11, wherein performing the first direct memory access operation comprises:
translating, using the translation table, the first user virtual address to the driver address in the second device driver address space; and
requesting the first data object from the first device driver using the driver address.

13. The host of claim 11,
wherein the physical memory further comprises:
a second application configured to:
send, to the second device driver, a second user virtual address space identifier and a process identifier, where the second user virtual address space identifier identifies a second user virtual address space corresponding to the first driver kernel memory, and wherein the process identifier identifies the second application; and
send, a second request for a second direct memory access operation, wherein the second request comprises a second user virtual address in the second user virtual address space, and wherein the second user virtual address references a second location storing a second data object in the first driver kernel memory, and wherein the second device driver is further configured to:
update, using the cookie structure and the second user virtual address space identifier, the translation table to map the second user virtual address space to the second device driver address space for the first driver kernel memory; and perform, by the second device driver, using the translation table, and the second user virtual address, the second direct memory access operation to transfer the second data object from the first driver kernel memory to the second driver kernel memory.

14. A non-transitory computer readable medium comprising computer readable program code embodied therein for causing a computer system to perform a method for performing direct memory access between a first device corresponding to a first device driver and a second device corresponding to a second device driver, wherein the first device and the second device are connected to a bus, the method comprising:
obtaining, by the second device driver from a first application, a first kernel address space identifier of a first driver kernel memory, wherein the first driver kernel memory is a portion of kernel space allocated to a first device driver;
obtaining, by the second device driver and using the first kernel address space identifier, a cookie structure binding the first driver kernel memory to a second device driver address space for the first driver kernel memory;
receiving by the second device driver from the first application, a first request for a first direct memory access operation, wherein the first request comprises a first location identifier of a first location storing a first data object in the first driver kernel memory; and
performing, by the second device driver, based on the cookie structure, and using the first location identifier, the first direct memory access operation to transfer the first data object from the first driver kernel memory to a second driver kernel memory, wherein the second driver kernel memory is a portion of kernel space allocated to the second device driver.

15. The non-transitory computer readable medium of claim 14, wherein the method further comprises:
receiving, by the second device driver from the first application, a first user virtual address space identifier of a first user virtual address space corresponding to the first driver kernel memory; and
generating, by the second device driver using the cookie structure, a translation table mapping the first user virtual address space to the second device driver address space,
wherein the first location identifier is a first user virtual address in the first user virtual address space, and wherein performing the direct memory access operation uses the translation table generated based on the cookie structure.

16. The non-transitory computer readable medium of claim 15, wherein the first user virtual address space identifier comprises a starting address in the first user virtual address space and a length, wherein user virtual addresses within a range defined by the starting address and the length correspond to locations in the first driver kernel memory.

17. The non-transitory computer readable medium of claim 15, wherein the method further comprises:
receiving, by the second device driver from the first application, a process identifier of the first application,
wherein the translation table maps the first user virtual address space with the process identifier to the second device driver address space.

18. The non-transitory computer readable medium of claim 15, wherein performing the first direct memory access operation comprises:
translating, using the translation table, the first user virtual address to a driver address in the second device driver address space; and
requesting the first data object from the first device driver using the driver address.

19. The non-transitory computer readable medium of claim 15, further comprising:
receiving, by the second device driver from a second application, a second user virtual address space identifier and a process identifier, where the second user virtual address space identifier identifies a second user virtual address space corresponding to the first driver kernel memory, and wherein the process identifier identifies the second application; and
updating, by the second device driver using the cookie structure and the second user virtual address space identifier, the translation table to map the second user virtual address space to the second device driver address space;
receiving, by the second device driver from the second application, a second request for a second direct memory access operation, wherein the second request comprises a second user virtual address in the second user virtual address space, and wherein the second user virtual address references a second location storing a second data object in the first driver kernel memory; and
performing, by the second device driver, using the translation table, and the second user virtual address, the second direct memory access operation to transfer the second data object from the first driver kernel memory to the second driver kernel memory.

20. The non-transitory computer readable medium of claim 14, wherein the first kernel address space identifier comprises a starting address and a length of the first driver kernel memory.

* * * * *